March 19, 1957     F. D. LEWIS     2,786,140
APPARATUS FOR FREQUENCY INTERPOLATION
Filed Aug. 22, 1952     5 Sheets-Sheet 1

INVENTOR
FRANK D. LEWIS,

BY Rines and Rines
ATTORNEYS

March 19, 1957 F. D. LEWIS 2,786,140
APPARATUS FOR FREQUENCY INTERPOLATION
Filed Aug. 22, 1952 5 Sheets-Sheet 2

INVENTOR
FRANK D. LEWIS,
BY Rines and Rines
ATTORNEYS

United States Patent Office 2,786,140
Patented Mar. 19, 1957

2,786,140

APPARATUS FOR FREQUENCY INTERPOLATION

Frank D. Lewis, Lexington, Mass., assignor to The General Radio Company, Cambridge, Mass., a corporation of Massachusetts Application August 22, 1952, Serial No. 305,863

14 Claims. (Cl. 250—36)

The present invention relates to apparatus for generating electric oscillations of predetermined interpolative frequencies. It relates also to methods of and apparatus for frequency monitoring, comparing, checking and measuring. The invention relates further, however, to the generation of electric oscillations of predetermined frequencies, and more particularly, pure frequencies.

It has been customary to check the frequency of broadcast transmitters, for example, against piezo-electric-crystal-controlled oscillators the crystals of which have been individually ground to the precise frequencies required for the respective channels. Interpolation systems of various types have also been proposed. Some of these have each utilized a piezo-electric-crystal-controlled standard of frequency and harmonic and sub-harmonic stages associated therewith. In others, the voltage of an unknown frequency has been combined with another voltage having two component frequencies one of which is known and the other unknown, but variable, at will. The value of the unknown frequency has been determined after adjusting it to produce a zero-beat indication. According to still a further technique, the frequencies to be measured have been beat successively with a series of comparison frequencies of successively decreasing magnitude, in order to render the resulting frequency of each beat lower than a definite frequency of a corresponding beat stage. All these prior-art systems, however, have been subject to many errors. In some instances, furthermore, these errors have been essentially cumulative, often rendering the results entirely untrustworthy.

An object of the present invention, accordingly is to provide a new and improved interpolative-frequency generator.

Another object is to provide a new and improved system for providing interpolative frequencies that shall not be subject to the above-described disadvantages of cumulative and other errors.

A further object of the invention is to provide a new and improved system for measuring and continuously monitoring the frequency of radio transmitters and the like with the aid of a standard crystal-controlled or other fixed-frequency standard reference oscillator that may be checked directly against standard frequencies, such as the transmissions of radio station WWV of the National Bureau of Standards.

Since, however, the frequencies to be monitored are not necessarily harmonically related to the standard-frequency transmissions, a further object of the invention is to provide a novel means for interpolating the desired frequency between any set of the harmonics or sub-multiples of the standard-frequency transmissions.

Another object still is to provide a novel means for directly locking the desired frequency to the reference frequency standard.

Still another object of the present invention is to provide a new and improved system for eliminating all but a desired frequency from a group of frequencies.

As the invention is not restricted to monitoring or measuring, it is also among the objects of the invention to provide a new and improved apparatus for generating oscillations of predetermined frequency, as well as transmitting the same.

Other and further objects will be explained hereinafter and will be more particularly pointed out in the appended claims.

With the above ends in view, a feature of the present invention involves the use of locked-oscillator units that shall insure that no signals shall be present in the circuits where the measurements are to be performed except the signals that are required for the purpose of the measurements. Protection is furthermore provided against the occurrence of spurious locking points in these locked oscilators, thereby reducing the possibility of effecting improper adjustments.

The invention will now be described more fully in connection with the accompanying drawings, in which.

Figure 2:
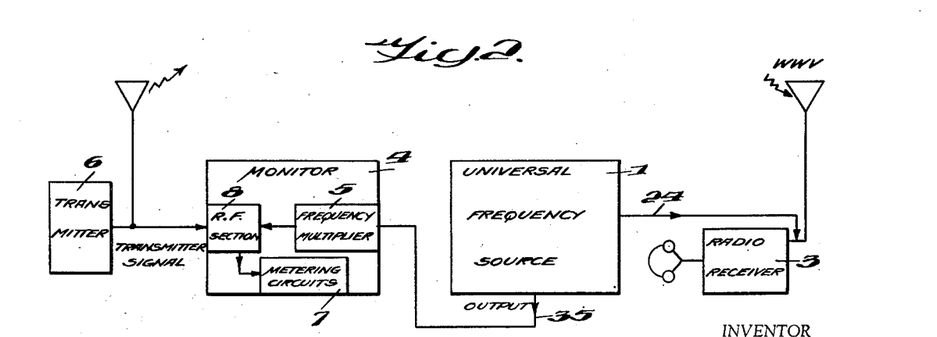
Fig. 2 is a similar block diagram illustrating this universal frequency source as used for the purpose of monitoring a radio-frequency broadcast transmitter.

In Fig. 2, there is illustrated a system that is operable in accordance with the present invention, for comparing the frequency of a radio-frequency broadcast transmitter 6, such as a television or radio station, with a signal of standard frequency received in a radio receiver 3 from the before-mentioned radio station WWV. Into the radio receiver 3 is fed both the WWV standard frequency transmissions as received in an antenna, and a reference standard frequency fed by conductors, represented at 24, from a crystal or other reference frequency standard 2 in the universal frequency source 1, presently to be more fully described. With the radio receiver 3 tuned to the standard-frequency signal of station WWV, therefore, it is possible, through direct comparison of the reference standard frequency of the universal frequency source 1 with the standard frequency transmitted by station WWV, as with the aid of the illustrated beat-detecting earphones, to calibrate the universal frequency source 1 once and for all. The universal frequency source 1, as will hereinafter be explained, is designed to generate any desired interpolated output frequency. Provision is made, as hereinafter more fully explained, for locking directly the desired generated interpolated frequency to the reference frequency standard. This interpolated output frequency may then be conducted from the universal frequency source 1, by way of output conductors, represented at 35, to a monitor 4 for monitoring the frequency of the transmitter 6 that it is desired to check. To this end, the interpolated output frequency may be multiplied in a frequency multiplier 5 of the monitor 4, and applied to a radio-frequency section 8 thereof, upon which is impressed also the signal from the transmitter 6 that is to be monitored. A direct comparison of these two frequencies in the radio-frequency section 8, with the aid of conventional metering circuits 7, will yield an indication of the frequency of the transmitter 6. A new and improved system has thus been devised, according to which the problem of checking the frequency of the transmitter 6 has become reduced to merely standardizing the reference frequency standard 2 of the universal frequency source 1 with respect to the standard signal transmitted from station WWV. Since the frequency of the transmitted standard signal is the accepted national standard frequency, employed by all stations, the frequency measurements of all stations will be attended with the same degree of accuracy. This accuracy is dependent, it will further be observed, upon solely a single initial calibration adjustment, effected during the comparison with station WWV.

Figure 1:
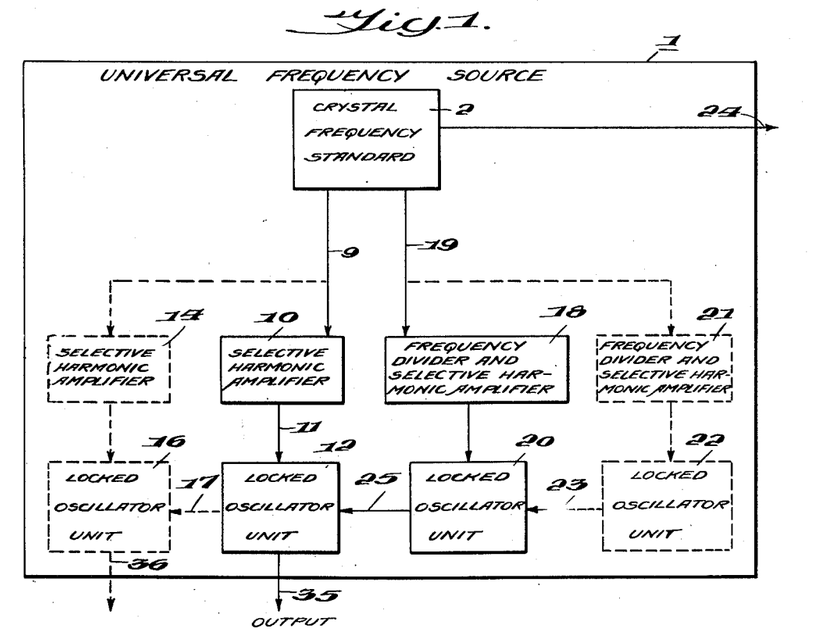
Fig. 1 is a block diagram illustrating a universal frequency source constructed in accordance with the present invention.

It is preferred, as illustrated in Fig. 1, that the reference standard 2 be constituted of a reference piezoelectric-crystal-controlled oscillator. It will be observed, also, that only a single crystal is required, in accordance with the present invention, in contradistinction to systems of the prior art employing multi-crystal units. Other frequency standards, such as a bar or a magnetostriction oscillator, however, may also be utilized, as is well understood in the art. The universal frequency source 1 comprises also a selective harmonic amplifier 10 that may be tuned to any desired harmonic of the fundamental frequency generated by the crystal frequency standard 2. The selective harmonic amplifier 10 is shown connected to the frequency standard 2 by conductors, represented at 9, and is connected, in its turn, by conductors, represented at 11, to a locked-oscillator unit or assembly 12. A further and a higher selective harmonic amplifier or amplifiers may also be used, as represented at 14, but shown by dotted lines, to indicate that such additional amplifier or amplifiers 14 is or are not necessary to an understanding of the present invention. If employed, the additional amplifier or amplifiers 14 will be similarly connected to a further locked-oscillator unit or units 16, represented by dotted lines, for a similar purpose. The locked-oscillator units 12 and 16 may be interconnected by conductors represented schematically by the dotted-line conductor 17.

The universal frequency source 1 is shown comprising, also, a frequency divider and selective harmonic amplifier 18, connected to the frequency standard 2 by conductors represented at 19. This frequency divider 18 may divide the crystal frequency into a desired fractional ratio, such as one-fifth, one-ninth, one-tenth, etc. Any desired harmonic of this fractional frequency, such as three-fifths, four-ninths, eight-tenths, etc., may then be amplified, for application to still a further locked-oscillator unit 20. The unit 20, in turn, is connected to the locked-oscillator unit 12 by conductors represented at 25.

A lower frequency or frequencies may similarly be interpolated by a further frequency divider and selective harmonic amplifier or further frequency dividers and selective harmonic amplifiers, represented by the dotted lines 21, and these may be fed to a further locked-oscillator unit or assembly or further locked-oscillator units or assemblies, represented, for the reasons before given, by dotted lines 22. The locked-oscillator unit or units 22 is or are connected to the locked-oscillator units 20 and 12 by conductors represented by the dotted-line conductor 23.

As will hereinafter be more fully explained, the respective locked-oscillator units 12 and 16 may be controlled, in accordance with the frequencies generated by the selective harmonic amplifiers 10 and 14, for the purpose of producing interpolative frequencies higher than the frequency of the crystal frequency standard 2. The interpolated output will be available at the last locked-oscillator unit 12 or 16, as the case may be, of the interconnected system, represented by the output conductor 35 or 36, respectively.

Figures 3, 4:
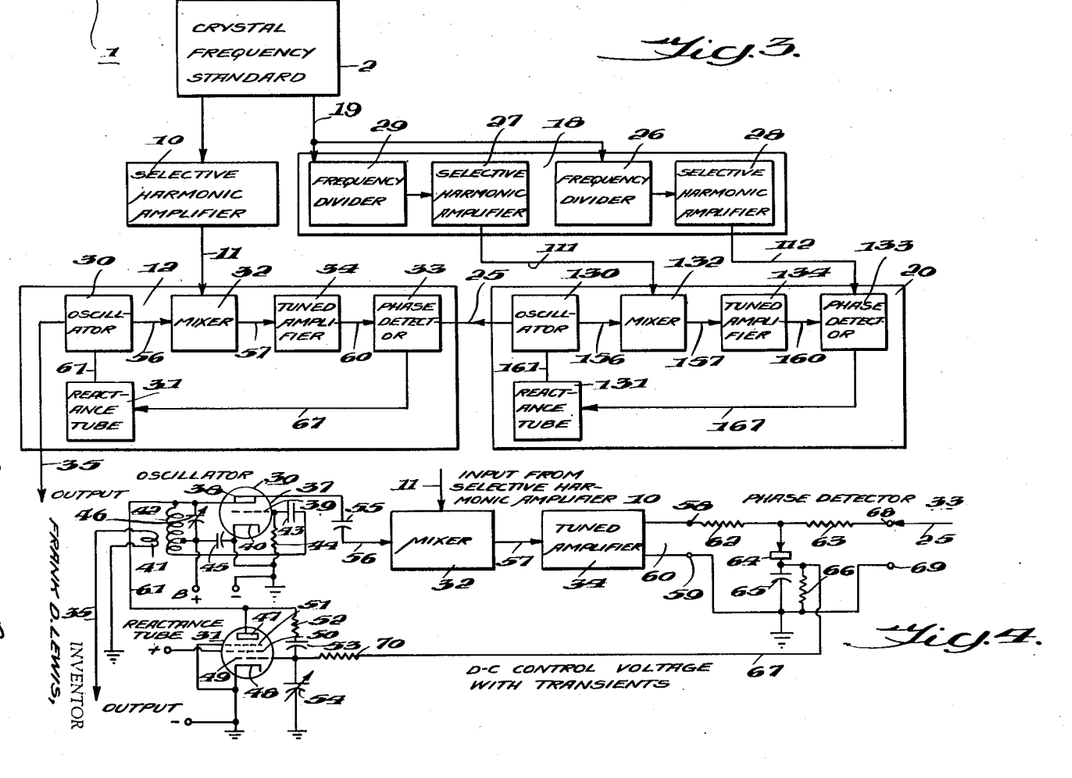
Fig. 3 is a more detailed block diagram of the said universal frequency source.
Fig. 4 is a circuit diagram of the locked-oscillator system illustrated in Figs. 1 and 3.

As the locked-oscillator units 12, 20, etc., provide protection against spurious locking points, as later more fully discussed, it is assured that no frequencies shall be present in their output circuits, except the signal frequencies which are actually required for measurement. The system of Fig. 3 is particularly designed to provide interpolative frequencies suitable for checking the channel frequencies of, for example, the ultra-high-frequency television broadcast band. The locked-oscillator unit 12 is shown in Fig. 3 comprising an oscillator 30, a mixer 32, a tuned amplifier 34, a phase detector 33 and a reactance tube 31. These are interconnected by conductors respectively represented by 56, 57, 60 and 67. The oscillator 30 is further connected to the reactance tube 31 by conductors represented at 61. The locked-oscillator unit 20 is composed of units similar to those of the locked-oscillator unit 12, corresponding elements of which are therefore represented by the same reference numerals, but augmented by 100. The oscillator 130 of the locked-oscillator unit 20 is connected by the conductors 25 to the phase detector 33 of the locked oscillator unit 12. The output conductors 35 of the locked oscillator unit 12 are led out from the oscillator 30 and provide the desired pure, predetermined interpolation frequency.

The frequency divider and selective harmonic amplifier 18 is shown in Fig. 3 comprising a frequency divider 29 connected to a selective harmonic amplifier 27, which is connected, by conductors represented at 111, to the mixer 132. The frequency divider and selective harmonic amplifier 18 is shown comprising also a further frequency divider 26 connected to a further selective harmonic amplifier 28, which is connected, by conductors represented at 112, to the phase detector 133. The frequency dividers 29 and 26 are connected in parallel, by the conductors 19, to the crystal frequency standard 2.

In Fig. 4, the output conductors 35 of the oscillator 30 are shown connected to a coupling loop 41, adjacent to the tank coil 42 of the oscillator 30. One end of the coupling loop 41 is shown grounded by way of one of the conductors 35. It will be understood that, in all instances where conductors are represented in the drawings by only a single conductor, one of the conductors may similarly be grounded.

In the mixer 32, the frequency of the oscillator 30 is beat or heterodyned with a reference frequency signal of the selective harmonic amplifier 10 that serves as a standard source of frequency since it is controlled by and derives its signal from the crystal frequency standard 2. The oscillator 30 is tuned coarsely to approximately a predetermined correct interpolation frequency, but differing from the frequency produced in the selective harmonic amplifier 10 by approximately a predetermined intermediate frequency; and the reference frequency signal may be a harmonic produced in the selective harmonic amplifier 10. The tuned amplifier 34 will select the desired approximately correct beat or intermediate frequency resulting from the heterodyning, which will then be applied to the phase detector 33. This approximately correct beat or intermediate frequency will be combined, in the phase detector 33, with a correct reference beat or intermediate frequency, which will be received, by way of the conductors 25, from the output locked oscillator 130 of the locked-oscillator unit 20. The output of the phase detector 33, as later explained, controls the fine tuning of the oscillator 30 through the reactance tube 31 to insure that the correct beat or intermediate frequency is produced in the mixer 32 and thus that the oscillator 30 is locked at the desired predetermined interpolation frequency. It is now in order to explain, however, how the oscillator 130 is locked at precisely this correct reference beat or intermediate frequency to insure the correct locking of the oscillator 30, as above explained.

The reference beat or intermediate frequency of the output locked oscillator 130 that ultimately controls the predetermined frequency of the oscillator 30, may be selectively determined by heterodyning with a reference signal frequency that is derived from the crystal frequency standard 2. This standard crystal frequency may be divided by any desired amount in the frequency divider 29, harmonically selected and amplified by any desired predetermined amount in the selective harmonic amplifier 27, and then applied to the mixer 132. The oscillator 130 is locked to produce the desired correct reference beat or intermediate frequency for controlling the locked oscillator unit 12 by heterodyning its output in the mixer 132, with the output of the harmonic amplifier 27. This heterodyning will produce a further beat or intermediate frequency that is selected in the tuned amplifier 134. This further beat or intermediate frequency is then fed to the phase detector 133. A reference for this further beat or intermediate frequency, controlled by the frequency standard 2, is obtained by frequency-dividing the output of the crystal frequency standard 2 in the frequency divider 26, and selectively harmonically amplifying it, as in the selective harmonic amplifier 28, before applying it, as the reference further beat frequency, to the phase detector 133. The two inputs to the phase detector 133 are thus the further beat frequency fed from the tuned amplifier 134 and the reference further beat frequency fed from the selective harmonic amplifier 28. The output of the phase detector 133, as later explained, controls the reactance tube 131 to effect the fine tuning of the oscillator 130, insuring that the desired further beat or intermediate frequency is produced in the mixer 132 and thus that the oscillator 130 is locked in frequency and phase at the said desired correct reference beat or intermediate frequency.

In this manner, therefore, the oscillator 130 is caused to operate, at any desired reference beat or intermediate frequency, by first comparing the frequency of its oscillations with a source of fixed standard frequency obtained from the frequency standard 2 through the frequency divider 29 and the selective harmonic amplifier 27. The beat frequency resulting from this comparison, in turn, is adjusted to a correct value by comparison, in the phase detector 133, with the standard frequency obtained, also from the frequency standard source 2, but through the frequency divider 26 and the selective harmonic amplifier 28. Since the oscillator 130, therefore, is locked at precisely the desired predetermined reference beat or intermediate frequency, it serves as a further reference standard frequency source for insuring that the frequency of the oscillator 30 of the locked-oscillator unit 12 shall differ from that of the selective harmonic amplifier source 10 by this same exact beat or intermediate frequency. Precisely the desired interpolated output frequency in the output 35 of the oscillator 30 is thus obtained.

Since the output of the locked oscillator 130 of the locked-oscillator unit 20, fed by conductors 25 to the locked-oscillator unit 12, is constituted solely of the oscillation frequency of the oscillator 130, namely, the desired reference beat frequency, without the presence of any spurious frequencies, this assures the correct locking point of the oscillator 30. The output of the locked oscillator 30, of course, will also contain only a pure frequency, namely, the desired interpolation frequency. Even though there will exist, in the selective harmonic amplifiers 10, 27 and 28, not only the desired harmonic, sub-harmonic or fractional harmonic frequencies, but also sub-harmonics and harmonics thereof, as well as cross-modulation and other spurious signals, and even though there will be present in the system the so-called image frequencies that always accompany two beating signals, and which are produced by subtraction or addition of the frequencies involved, the locked oscillator units 12 and 20 will not lock on any of the spurious frequencies.

By suitable choice of the operating frequency ranges of these locked-oscillator units 12 and 20, therefore, it is possible to insure the stability and the accuracy of adjustment of the various locked oscillators. The limit of interpolation, furthermore, depends solely upon the number of locked-oscillator units that it is deemed necessary to employ, in order to obtain the simple exact fractional ratio between the interpolation frequency desired and the frequency of the reference crystal standard 2. The selection, according to the present invention, of successive remainders of successively lowered frequencies, in combination with the locked-oscillator assemblies and the harmonic amplifiers, provides for the elimination of spurious signals throughout the whole interpolative range, and results in a single pure frequency, of extreme accuracy.

The details of the preferred locked-oscillator circuit of Fig. 3 are shown in Fig. 4. The oscillator 30 may, for example, be of the Hartley type, comprising a triode vacuum tube 37, having a plate 38, a control-grid 39, and a cathode 40. The positive and negative terminals of the plate-supply voltage of the oscillator 30 are respectively indicated at B+ and —. The upper end of the tank coil 42 is shown connected to the plate 38, and its lower end, through a grid condenser 43, to the grid 39. The grid 39 is shown grounded through a grid-leak resistor 44. This ground may be connected to the negative terminal of the plate supply of the oscillator 30. The cathode 40 may also be connected to the ground and also, through a by-pass condenser 45, to an intermediate point of the coil 42. At this intermediate point may be connected the B+ terminal of the said plate-supply voltage. A variable tuning condenser 46 is shown connected between this intermediate point and the upper end of the coil 42. This condenser 46 provides the before-described coarse tuning of the oscillator 30. The plate 47 of the pentode-type reactance tube 31 is connected to the upper end of the tank circuit 42, 46 of the oscillator 30. The cathode 48 of the reactance tube 31 being shown grounded, is thus also connected to the negative supply-voltage terminal. The reactance tube 31 is also provided with a control grid 49, a screen grid 50 and a suppressor electrode 51, shown strapped to the cathode 48. The screen grid 50 is shown connected to the positive terminal of a source of screen-grid potential, illustrated by the + terminal. A phasing resistor 52 is connected, in series with a blocking condenser 53, between the control grid 49 and the plate 47 of the reactance tube 31. The control grid 49 is connected to ground through a variable reactance-tube phase-shift-adjusting condenser 54. To the control grid 49 there is shown connected the left-hand terminal of an isolating resistor 70, the right-hand terminal of which is by-passed to ground, with respect to radio frequency, by a condenser 65. The isolating resistor 70 and the condenser 65 are thus connected in series between the control grid 49 and the grounded cathode 48 of the reactance tube 31. The reactance tube 31 is thus part of the tuned circuit of the oscillator 30, and its reactance controls the fine tuning or adjustment of the frequency and the phase thereof.

The plate 38 of the oscillator 30 is connected, through a coupling condenser 55, by way of one of the conductors 56, to the mixer 32. The beat frequency output of the mixer, after passing through the tuned amplifier 34, is fed by the conductors 60 to the left-hand input terminals 58 and 59 of the phase detector 33. The phase detector 33 is shown, in preferred form, as a simple T-network having a pair of series-connected arms comprising impedances 62 and 63, shown as equal resistors at the top of the T, and an intermediate shunt-connected grounded arm comprising a diode rectifier 64, preferably of the crystal type, and an R-C decoupling low-pass filter network comprising a resistor 66 and the by-pass condenser 65. The resultant beat signal from the mixer 32 is therefore transmitted, from terminals 58 and 59, to the series-connected resistor 62 and to the grounded end of the shunt arm of the phase detector 33. The same grounded end of the shunt arm and the other series-connected resistor 63 are connected to the right-hand input terminals 69 and 68, respectively, of the phase detector 33. The terminals 68 and 69, in turn, are connected, by way of the conductors 25, to the oscillator 130. The resistor arms 62 and 63 thus isolate the tuned amplifier 34 from the locked-oscillator unit 20.

In operation, let it first be assumed that the two input signals combined in the phase detector by feeding from the mixer 32 to the left-hand input terminals 58, 59, and from the oscillator 130 to the right-hand input terminals 68 and 69, are of exactly the same frequency and magnitude. When the signals are in phase, the voltages on the two resistor arms 62 and 63 will increase and decrease in unison, and a maximum signal will therefore be presented to the diode rectifier 64. Should the voltages at each side of the phase detector 33, on the other hand, be in antiphase, no voltage, or a relatively small voltage, will appear across the rectifier 64. If these voltages, moreover, should be in phase quadrature, an intermediate value of voltage will appear at the diode rectifier 64. In accordance with the variations in phase and frequency of the signals from the mixer 32 and the oscillator 130, therefore, different direct-current control voltages with superposed transients, hereinafter sometimes referred to as direct-current or rectified voltages, will appear at the output terminals at the two ends of the resistor 66 of the phase detector 33, as a consequence of the detection, in the phase detector 33, of the differences in phase of the two signals. These control voltages, the magnitude of which is indicative of the said phase differences, will be transmitted, by way of the conductors 67, through the isolating resistor 70, to between the control grid 49 and the cathode 48 of the reactance tube 31. This will result in varying the reactance of the reactance tube 31 in accordance with the control voltages, thereby effecting the before-described fine tuning of the oscillator 30. When the output oscillator 30 of the locked-oscillator unit 12 is tuned to exactly the right frequency, of course, the beat frequency generated in the locked oscillator unit 12 will be exactly equal to the frequency of the reference beat-frequency signal transmitted to the phase detector 33 of the locked-oscillator unit 12 from the oscillator 130 of the adjacent locked-oscillator unit 20. In reaching this condition, however, as the locking point is approached, the phase detector 33 will produce a rapidly varying direct-current control voltage of the proper magnitude and sign that will be supplied to the reactance tube 31 until the condition is reached where the oscillator 30 becomes properly and rigidly locked in phase at the desired frequency. The controlled reactance of the reactance tube 31 will thus maintain the output oscillator 30 tuned to the exact interpolation frequency required with fixed or constant phase.

With the aid of the phase detector 33, it has been found possible to detect the exact zero frequency difference or other reference beat condition between the locked oscillator 30 and the reference frequency. Since this condition must be established in each of the various locked-oscillator units 12 and 20, and also in the others represented at 16 and 22, if they are used, it is essential that the circuit used for detection of a zero or other reference beat condition be very stable and sensitive. By the use of the above-described feed-back type of control from the phase detector to the reactance tube, the stability of the oscillator 30 has, in practice, been maintained perfectly insofar as the average value of the frequency is concerned, and to within a very small fractional part, 1/3600, or less, of only a single cycle, for instantaneous values. Although the feedback conditions in the stabilizing circuit may allow a small amount of transient disturbance in the phase of the oscillation, the nature of this phase-detector controlled locking system eliminates completely any cumulative errors in locking to the desired frequency. The invention therefore provides absolute positive control of the exact value of the average frequency. By proper adjustment of the phase detectors in the locking systems, indeed, it is possible to obtain a signal with sufficient phase and frequency stability to enable even the measurement of frequency modulation noise in transmission systems.

Though this particular phase detector 33 is quite simple, and has, in practice, been found to be quite effective for the purposes herein described, it is to be understood, that other types of phase detectors may also be employed, depending upon the desired application of the device. The impedance arms 62 and 63 may be capacitive, in which event a shunt resistor, choke or other direct-current impedance element may be connected across the shunt arm containing the rectifier 64. The arms 62 and 63 may, on the other hand, comprise similar inductors. The desired result may be obtained also, within limits, by other types of circuits, such, for example, as cycle-counter-type frequency metering circuits. The sensitivity of these other devices is not, however, quite so high at the correct zero or reference beat point as is that of the phase detector 33.

For the before-described application to ultra-high-frequency television bands, the present invention may operate as follows. For purposes of illustration, the channel 20 of this ultra-high-frequency television band may be considered. The frequency of the sound transmitter is 511.75 megacycles per second. The monitoring circuit of the monitor 4, Fig. 2, requires a 150-kilocycle intermediate frequency. The output frequency of the reference oscillator system must therefore be 511.6 megacycles per second. A multiplication ratio of 48:1 is convenient in this application, thus requiring a frequency for the output reference locked oscillator 12 of 10,658⅓ kilocycles per second. The frequency of the crystal frequency standard 2 is chosen at 1 megacycle per second, and the selective harmonic amplifier 10 is tuned to the tenth harmonic of this frequency, or 10 megacycles per second. The beat or intermediate frequency produced by the oscillator 30 and this 10 megacycles frequency is 658⅓ kilocycles per second. The oscillator 130 that applies the correct reference beat or intermediate frequency to the phase detector 33 will oscillate at the frequency of 658⅓ kilocycles per second. This 658⅓ kilocycle frequency is fed, also, to the mixer 132. The frequency of the frequency divider 29 is adjusted to the frequency given by the channel spacing (6 megacycles) divided by the multiplication ratio (48). This frequency is thus ⅛ megacycle, or 125 kilocycles per second. The fifth harmonic of this frequency (625 kilocycles) is amplified in the selective harmonic amplifier 27, and is then heterodyned with the frequency of 658⅓ kilocycles per second fed to the mixer 132 from the oscillator 130, as before described. The frequency divider 26 comprises a ⅝ ratio frequency divider to 200 kilocycles per second, and a ⅙ ratio divider to 33⅓ kilocycles per second. The selective harmonic amplifier 28 is not used, in this case, the 33⅓ kilocycle per second being applied directly to the phase detector 133, along with the beat between the 658⅓ kilocycle per second frequency of the oscillator 130 and the 625 kilocycle per second signal from the frequency divider 29 and the harmonic amplifier 27, which is also 33⅓ kilocycles per second. The phase detector 133 is thus operative and a control voltage is supplied to the reactance tube 131 to control the locked oscillator 130 at the correct reference beat frequency of 658⅓ kilocycles per second, thereby to insure the locking of the oscillator 30 at the desired interpolation frequency of 10,658⅓ kilocycles per second.

By using frequencies in the range from 9 to 16 megacycles per second for the frequency of the output oscillator 30 of the universal frequency source 1, adequate excitation may be supplied to the existing frequency multiplier chain in the monitoring equipment 4 which is now used for monitoring ultra-high-frequency television stations. This output frequency is produced by the above-described interpolative system between integral harmonics of the reference crystal frequency of the standard 2 that are produced in the selective harmonic amplifier 10, in integral values, such as 9, 10, . . . 16, by selecting the tuning of the amplifier 10.

The interpolation between the harmonics of the crystal frequency of the standard 2 is thus performed by the frequency divider units 26, 29, with their associated selective harmonic amplifiers 27, 28. The constants of these frequency dividers are so chosen that they shall perform a division of the frequency of the crystal frequency standard by the required ratio. In most cases, the ratio of an individual frequency divider circuit will be some integral number between 2 and 20. These integral numbers are chosen to fit the particular frequencies required. Combinations containing more than one divider are used for higher ratios, as in the above illustration. Harmonics of these divided frequencies may then be selected by the selective harmonic amplifiers, in order to produce fractions, such as 3/5 or 9/14, of the crystal frequency-standard reference frequency. The frequency dividers may also consist of several units in series, in order to give larger division ratios, these divided frequencies again being multiplied in the selective harmonic amplifiers.

Under some conditions, it is desirable to use a harmonic of the beat frequency produced in the mixer stage of the locked-oscillator unit. This condition may arise when it is desired to add another factor in the frequency-division ratio, or where the beat frequency is of such relatively low value as to prevent rapid correction for phase differences in the phase detector near zero. This device is also sometimes useful for preventing the possibility of spurious locking frequencies. The desired result may be easily achieved by tuning the tuned amplifier 34 or 134 to a harmonic of the beat frequency.

The frequency dividers 29, 26 may take the form of multivibrators, or they may comprise a step-charging double diode divider, or a regenerative-modulation type circuit, or any other type of similar divider circuit. The selective harmonic ampliers 10, 27 and 28 may be conventional harmonic multipliers, such as are used in ordinary radio broadcast transmitters, tunable to the desired harmonic frequency. Under some circumstances, well-known harmonic amplifier circuits may be used which discriminate against odd harmonics or against even harmonics in order to diminish the possibility of spurious locking points in the system. Tuned circuits or other selective devices, such as crystal filters, may be used to select the proper harmonic, and suitable means may be provided for the selection of the required harmonic in the apparatus, such as a calibrated dial or a selector switch (not shown). Similar calibrated dials or selector switches (not shown) may be used in connection with the frequency-divider circuit elements and their associated selective harmonic amplifiers, as well.

Figure 5:
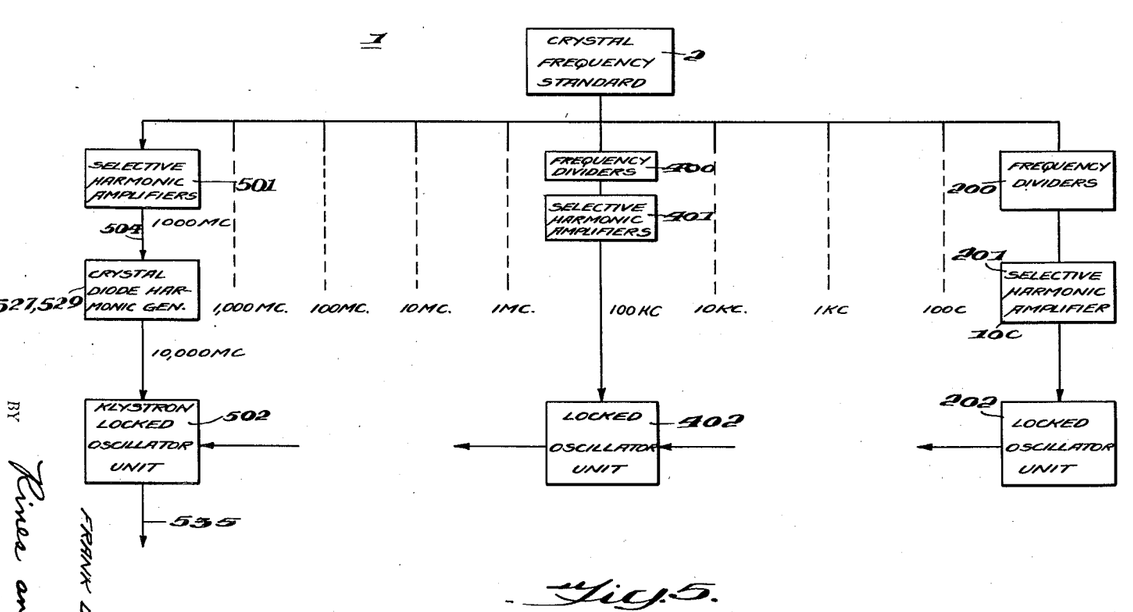
Fig. 5 is a block diagram similar to Fig. 1 of a universal frequency source adapted to provide decimal frequency interpolation.

While the before-mentioned systems provide for interpolation using exact fractional ratios, it is also possible to provide decade systems. Such a decade system, illustrated in Fig. 5, may embody harmonic amplifiers that may continuously cover the interpolation of all frequencies between any two desired limits, such as, for example, as 10 cycles per second and 10,000 megacycles per second. The crystal frequency standard 2 may operate at one-megacycle fundamental frequency. The frequency-divider system 200, which may require several successive frequency-dividing stages, as before discussed, may be utilized, in conjunction with a selective harmonic amplifier 201, to produce a 10-cycle frequency that is fed into a locked-oscillator unit 202, in the manner before described in connection with the system of Figs. 3 and 4.

Figure 7:
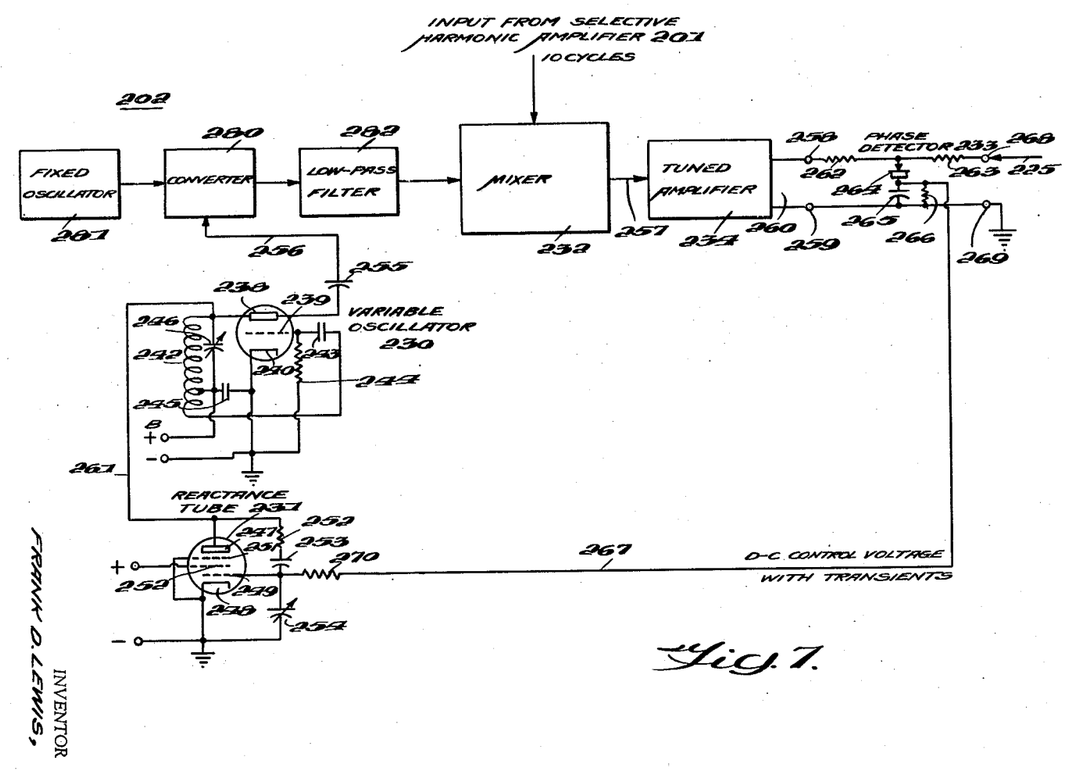
Fig. 7 is similarly a partial circuit diagram of the locked oscillator unit for use at the low-frequency end of the system of Fig. 5.

The details of one form of a 10-cycle system are shown in Fig. 7. At so low a frequency, there are some advantages in the use of a beat frequency audio oscillator as contrasted with the previously decribed single oscillator 30. A variable locked oscillator 230, corresponding in all particulars to the oscillator 30, except for the frequency of the tuning, and a reactance tube 231 and phase detector 233, corresponding respectively to the reactance tube 31 and the phase detector 33, are shown provided with elements similar to those described above in connection with the circuit of Fig. 4, corresponding elements thereof being represented by the same reference numerals, but augmented by 200. The oscillations of the variable oscillator 230 of the locked-oscillator unit 202 are first mixed, in a converter 280, with the oscillations of a fixed oscillator 281, to produce a required very low beat frequency. The output is then filtered in a low-pass filter 282 and fed to the mixer 232. Also fed into the mixer 232 is the 10-cycle input signal from the selective harmonic amplifier 201, the resulting beat being fed, by way of the conductor 257, to the tuned amplifier 234, for application, by way of the conductors 260, to the terminals 258 and 259 of one side of the phase detector 233. Into the other side of the phase detector 233 may be fed the desired beat frequency that the output of the mixer 232 is to assume, in order that the variable oscillator 230 may be locked at the desired low frequency. The output of the locked oscillator 202 may then be fed to the phase detector of the next successive locked oscillator (not shown), for use with the 100-cycle harmonic frequency. Although the 10-cycle system described uses a beat-frequency oscillator, other types of low-frequency oscillators may be used, such as resistance-capacitance phase-shift oscillators, embodying electron tubes as part of the resistance-capacitance elements and tunable by means of a control voltage or current applied to the tubes.

The mid-frequency decade units may be of the type previously described in connection with Figs. 3 and 4. The 100-kilocycle unit, for example, is shown comprising frequency dividers 400 and selective harmonic amplifiers 401 for producing the 100-kilocycle signal, and the locked-oscillator unit 402 corresponding to the locked-oscillator unit of Figs. 3 and 4, controlled from the oscillator of the locked-oscillator unit of the 10-kilocycle decade (not shown), and feeding, in turn, the phase detector of the locked oscillator unit of the 1-megacycle system (not shown). Since the crystal-frequency standard 2 has been adjusted to the 1-megacycle frequency, neither frequency dividers nor selective harmonic amplifiers are needed in connection with the 1-megacycle system, and this frequency may be fed directly to the locked-oscillator unit of this system. The 10-megacycle, the 100-megacycle and the 1,000-megacycle units may similarly be used to provide these units of the decades.

Figure 6:
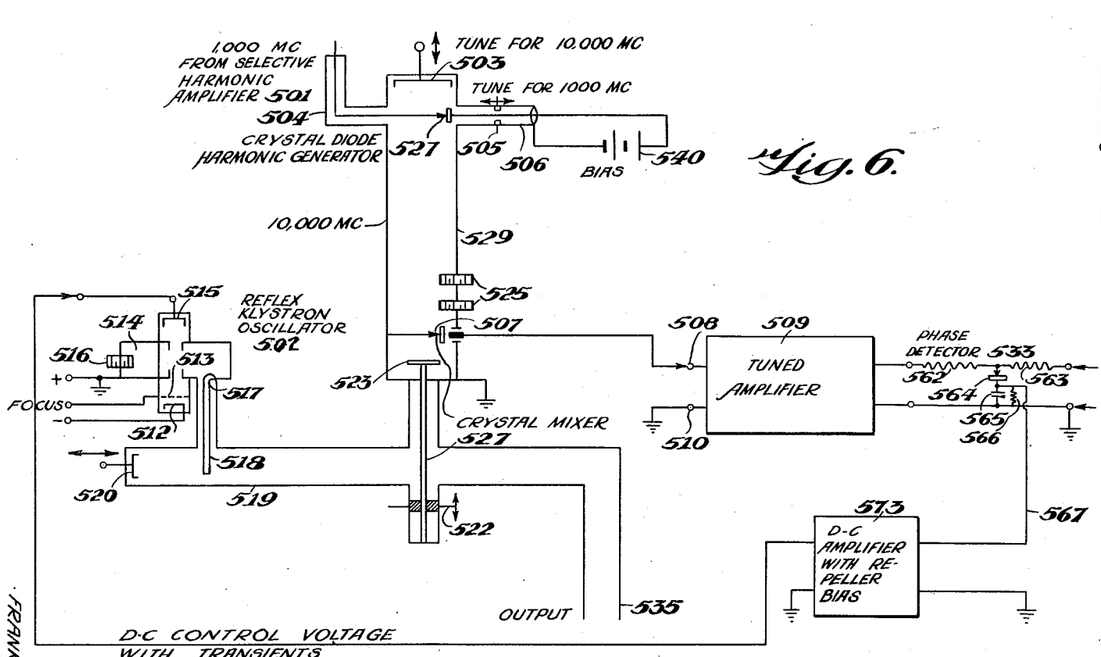
Fig. 6 is a partial circuit diagram of the high-frequency locked oscillator unit for use at the upper end of the frequency band covered by the system of Fig. 5.

The selective harmonic amplifiers 501, at the upper end of the system, in view of the very high frequencies involved, may also be of a form different from that previously described in connection with Figs. 3 and 4. A suitable system adapted for this decade is illustrated in Fig. 6. The selective harmonic amplifier 501 may comprise a conventional light-house-type circuit, producing a 1000-megacycle frequency. This may be fed by a coaxial line 504 to a crystal-diode harmonic generator 527, 529, the crystal 527 of which is disposed within a waveguide 529, shown provided with a stub containing a tuning plunger 503. The waveguide 529 is shown provided, also, with further tuning screws 525. The crystal diode 527 is terminated in a coaxial stub 506 provided with a shorting tuner 505, for tuning to the 1000-megacycle input signal. Bias voltage is supplied for the crystal diode as by means of a battery or other source of energy 540, connected between the outer conductor of the coaxial stub 506 and the crystal diode 527. The wave guide 529 may be of such cross-dimension as to cut-off radio-frequency energy below, say, about 8000 megacycles. By adjusting the tuning plunger 503, therefore, the waveguide 529 may be tuned for the 10th harmonic of the input 1000-megacycle signal, so that 10,000-megacycle waves are propagated therealong.

The 10,000-megacycle waves propagated along the waveguide 529 will be detected in a crystal-diode mixer 507, connected at one side, to a wall of the waveguide 529 and connected, at the other side, to the upper input terminal 508 of a tuned amplifier 509. The outer wall of the waveguide 529 may be grounded, as shown, in order to afford a ground connection to the lower grounded input terminal 510 of the tuned amplifier 509. The locked oscillator of the high-frequency system of Fig. 6 may be constituted of a reflex klystron 502 having a cathode 512, a control grid 513 and grounded cavity anodes 514. Focus potential may be supplied between the control grid 513 and the cathode 512, as is well known, and the grounded cavity of the klystron may be rendered positive with respect to the cathode 512 by a source of anode potential indicated at +. A tuning screw 516 may be employed for effecting coarse tuning, and a repeller electrode 515 may be provided for effecting fine tuning of the oscillator in response to direct-current control voltages supplied thereto. A coupling loop 517 in the klystron cavity may terminate in a probe 518 for transmitting the oscillations of the klystron oscillator into a further waveguide 519. The waveguide 519 may be tuned to select the desired output of the klystron oscillator by means of a tuning plunger 520. The oscillations propagated along the waveguide 519 may be picked up by a further probe 527, one end of which may be tuned by a slidable tuning plunger 522 in a stub, and the other end of which extends into the waveguide 529 and terminates in a coupling member 523 disposed near the crystal mixer 507. The crystal mixer 507 thus receives, not only the 10,000-megacycle waves generated in the waveguide 529, but also the oscillations of the reflex klystron oscillator 502, producing a beat frequency therefrom that is fed to the terminals 508, 510 of the tuned amplifier 509. This tuned amplifier selects the desired beat frequency, and transmits it to one side of a phase detector 533, which may be of precisely the same nature as before-described. The same reference numerals are therefore applied to corresponding elements of this phase detector 533, but augmented by 500. The other side of the phase detector 533 receives the output of the locked-oscillator unit of the 1000-megacycle decade. The resulting direct-current and superposed transient control voltages at the rectifier 564 across the resistor 566, are preferably impressed upon a direct-current amplifier 573 that may also supply the bias voltage for the repeller electrode 515. The fine tuning of the klystron oscillator 502 will thus be controlled in accordance with the control voltage from the phase detector 533 applied to the repeller electrode 515, thereby to lock the reflex klystron 502 at the desired frequency. The control range, moreover, is considerably broadened through the use of the direct-current amplifier since relatively wide frequency changes of the oscillator can be effected by the amplified direct-current and superposed transient control voltages. The output of the system is illustrated, in Fig. 6, as constituted of an extension 535 of the waveguide 519. This output voltage will have the one frequency only of the locked frequency of oscillations of the reflex klystron oscillator 502.

Though the present invention has been described above in connection with the monitoring of a radio-frequency broadcast station 6, it is also of more general use, and particularly wherever an interpolated frequency is desired, with high accuracy. The universal frequency source 1 of the present invention may be utilized, for example, to cover the band of present-day mobile radio-telephone equipment. In particular, the decade system illustrated in Fig. 5, with three units having frequency increments of 1-megacycle, 100 kilocycles and 10 kilocycles, may be used to provide reference frequencies throughout the mobile radio-telephone band. As a further illustration, the invention may be used also for the purpose merely of generating oscillations of a predetermined frequency, as well as to transmit the same; and not only interpolated frequency, but also pure frequencies such as may be obtained, for example, by employing the frequency divider and selective harmonic amplifier 18 and the locked oscillator unit 20, without the selective harmonic amplifier 10 and the locked oscillator unit 12.

Further modifications will occur to persons skilled in the art, and all such are considered to fall within the spirit and the scope of the present invention, as defined in the appended claims.

What is claimed is:

1. A system for generating oscillations of an interpolative radio frequency having, in combination, a standard source of electric oscillations including a radio frequency differing by an intermediate radio frequency from the interpolative frequency, an output oscillator tunable approximately to the interpolative frequency, an output-oscillator mixer connected to the source and the output oscillator to produce therein by beating oscillations of approximately the intermediate frequency, a reference oscillator, means for connecting the reference oscillator to cause it to oscillate at the said intermediate frequency, a reference-oscillator mixer, means for connecting the reference-oscillator mixer to the source and the reference oscillator, a reference-oscillator phase detector, means for connecting the reference-oscillator phase detector to the source and the reference-oscillator mixer, means for locking the reference oscillator in accordance with the voltage of the reference-oscillator phase detector at precisely the said intermediate frequency with constant phase, an output-oscillator phase detector connected to the output-oscillator mixer and the reference oscillator, and means for locking the output oscillator in accordance with the voltage of the output-oscillator phase detector at the precise interpolative frequency with constant phase.

2. A system for generating oscillations of an interpolative frequency locked to a standard radio frequency having, in combination, a standard source of electric oscillations, means for deriving from the source oscillations of frequency differing by a first predetermined intermediate radio frequency from the interpolative frequency, a first oscillator tunable to approximately the interpolative frequency, a first mixer connected to the deriving means and the oscillator for producing therein by beating oscillations of approximately the first predetermined intermediate frequency, a second oscillator tunable to approximately the first predetermined intermediate frequency, means for deriving from the source oscillations of frequency differing by a second predetermined intermediate radio frequency from the first predetermined intermediate frequency, a second mixer connected to the last-named deriving means and the second oscillator for producing therein by beating oscillations of approximately the second predetermined intermediate frequency, means controlled from the source for generating oscillations of precisely the second predetermined intermediate frequency, a phase detector connected to the generating means and the second mixer for combining the oscillations of the same to obtain a voltage indicative of the difference in phase between them, means controlled in accordance with the said voltage for locking the frequency of oscillations of the second oscillator at precisely the said first predetermined intermediate frequency with constant phase, a further phase-detector connected to the first mixer and the second oscillator for combining the oscillations of the same to obtain a further voltage indicative of the difference in phase between them, and means controlled in accordance with the said further voltage for locking the frequency of oscillations of the first oscillator at precisely the said interpolative frequency with constant phase.

3. A system for generating oscillations of an interpolative frequency locked to a standard radio frequency having, in combination, a standard source of electric oscillations, means for deriving from the source oscillations of frequency differing by a first predetermined intermediate radio frequency from the interpolative frequency, a first oscillator tunable to approximately the interpolative frequency, a first mixer connected to the deriving means and the oscillator for producing therein by beating oscillations of approximately the first predetermined intermediate frequency, a second oscillator tunable to approximately the first predetermined intermediate frequency, means for deriving from the source oscillations of frequency differing by a second predetermined intermediate radio frequency from the first predetermined intermediate frequency, a second mixer connected to the last-named deriving means and the second oscillator for producing therein by beating oscillations of approximately the second predetermined intermediate frequency, means controlled from the source for generating oscillations of precisely the second predetermined intermediate frequency, a phase detector connected to the generating means and the second mixer for combining the oscillations of the same to obtain a voltage indicative of the difference in phase between them, a reactance controlled in accordance with the said voltage, means controlled in accordance with the said reactance for locking the frequency of oscillations of the second oscillator at precisely the said first predetermined intermediate frequency with constant phase, a further phase-detector connected to the first mixer and the second oscillator for combining the oscillations of the same to obtain a further voltage indicative of the difference in phase between them, a further reactance controlled in accordance with the said further voltage, and means controlled in accordance with the said further reactance for locking the frequency of oscillations of the first oscillator at precisely the said interpolative frequency with constant phase.

4. The system claimed in claim 3 and in which the said reactance and further reactance comprise reactance tubes.

5. The system claimed in claim 3 and in which the first and second-named deriving means comprise harmonic amplifier means.

6. The system claimed in claim 3 and in which the first-named deriving means comprises a harmonic amplifier, the second-named deriving means comprises a frequency divider and a harmonic amplifier, and the said generating means comprises a further frequency divider.

7. A system for generating oscillations of an interpolative radio frequency having, in combination, a standard source of electric oscillations including a first frequency differing by an intermediate radio frequency from the interpolative frequency, second and third radio frequencies, an output oscillator tunable approximately to the interpolative frequency, an output-oscillator mixer connected to receive the first frequency from the source and connected to the output oscillator to produce therein by beating oscillations of approximately the intermediate frequency, a reference oscillator provided with means for causing it to oscillate at the said intermediate frequency, a reference-oscillator mixer, means for connecting the reference-oscillator mixer to the reference oscillator and to receive the second frequency from the source, a reference-oscillator phase detector, means for connecting the reference-oscillator phase detector to the reference-oscillator mixer and to receive the third frequency from the source, means for locking the reference oscillator in accordance with the voltage of the reference-oscillator phase detector at precisely the said intermediate frequency with constant phase, an output-oscillator phase detector connected to the output-oscillator mixer and the reference oscillator, and means for locking the output oscillator in accordance with the voltage of the output-oscillator phase detector at the precise interpolative frequency with constant phase.

8. A system for generating oscillations of an interpolative radio frequency having, in combination, a standard source of electric oscillations including a first frequency differing by an intermediate radio frequency from the interpolative frequency, second and third radio frequencies, an output oscillator tunable approximately to the interpolative frequency, an output-oscillator mixer connected to receive the first frequency from the source and connected to the output oscillator to produce therein by beating oscillations of approximately the intermediate frequency, means for selecting an harmonic of the intermediate frequency, a reference oscillator tunable to oscillate at the said harmonic of the intermediate frequency, a reference-oscillator mixer, means for connecting the reference-oscillator mixer to the reference oscillator and to receive the second frequency from the source, means for selecting a further harmonic from the reference-oscillator mixer, a reference-oscillator phase detector, means for connecting the reference-oscillator phase detector to the further harmonic selecting means and to receive the third frequency from the source, means for locking the reference oscillator in accordance with the voltage of the reference-oscillator phase detector at precisely the said harmonic of the intermediate frequency with constant phase, an output-oscillator phase detector connected to the first-named harmonic-selecting means and the reference oscillator, and means for locking the output oscillator in accordance with the voltage of the output-oscillator phase detector at the precise interpolative frequency with constant phase.

9. A system for generating oscillations of an interpolative radio frequency having, in combination, a standard source of electric oscillations including a first frequency differing by an intermediate radio frequency from the interpolative frequency, second and third radio frequencies, an output oscillator tunable approximately to the interpolative frequency, an output-oscillator mixer connected to receive the first frequency from the source and connected to the output oscillator to produce therein by beating oscillations of approximately the intermediate frequency, a reference oscillator provided with means for causing it to oscillate at the said intermediate frequency, a reference-oscillator mixer, means for connecting the reference-oscillator mixer to the reference oscillator and to receive the second frequency from the source, means for selecting an harmonic from the reference-oscillator mixer, a reference-oscillator phase detector, means for connecting the reference-oscillator phase detector to the harmonic-selecting means and to receive the third frequency from the source, means for locking the reference oscillator in accordance with the voltage of the reference-oscillator phase detector at precisely the said intermediate frequency with constant phase, an output-oscillator phase detector connected to the output-oscillator mixer and the reference oscillator, and means for locking the output oscillator in accordance with the voltage of the output-oscillator phase detector at the precise interpolative frequency with constant phase.

10. A system for generating oscillations of an interpolative radio frequency having, in combination, a standard source of electric oscillations including a first frequency differing by an intermediate radio frequency from the interpolative frequency, second and third radio frequencies, an output oscillator tunable approximately to the interpolative frequency, an output-oscillator mixer connected to receive the first frequency from the source and connected to the output oscillator to produce therein by heating oscillations of approximately the intermediate frequency, means for selecting an harmonic of the intermediate frequency, a reference oscillator tunable to oscillate at the said harmonic of the intermediate frequency, a reference-oscillator mixer, means for connecting the reference-oscillator mixer to the reference oscillator and to receive the second frequency from the source, a reference-oscillator phase detector, means for connecting the reference-oscillator phase detector to the reference-oscillator mixer and to receive the third frequency from the source, means for locking the reference oscillator in accordance with the voltage of the reference-oscillator phase detector at precisely the said harmonic of the intermediate frequency with constant phase, an output-oscillator phase detector connected to the harmonic-selecting means and the reference oscillator, and means for locking the output oscillator in accordance with the voltage of the output-oscillator phase detector at the precise interpolative frequency with constant phase.

11. A system for generating oscillations of an interpolative radio frequency locked to a standard frequency having, in combination, a standard source of electric oscillations, means for deriving from the source oscillations of radio frequency differing by a first predetermined intermediate radio frequency from the interpolative frequency, a first oscillator tunable to approximately the interpolative frequency, a first mixer connected to the deriving means and the oscillator for producing therein by beating oscillations of approximately the first predetermined intermediate frequency, a second oscillator tunable to approximately the first predetermined intermediate frequency, means for deriving from the source oscillations of radio frequency differing by a second predetermined intermediate radio frequency from the first predetermined intermediate frequency, a second mixer connected to the last-named deriving means and the second oscillator for producing therein by beating oscillations of approximately the second predetermined intermediate frequency, means for selecting an harmonic of the second predetermined intermediate frequency, means controlled from the source for generating oscillations of precisely the frequency of the said harmonic of the second predetermined intermediate frequency, a phase detector connected to the generating means and the harmonic-selecting means for combining the oscillations of the same to obtain a voltage indicative of the difference in phase between them, means controlled in accordance with the said voltage for locking the frequency of oscillations of the second oscillator at precisely the said first predetermined intermediate frequency with constant phase, a further phase-detector connected to the first mixer and the second oscillator for combining the oscillations of the same to obtain a further voltage indicative of the difference in phase between them, and means controlled in accordance with the said further voltage for locking the frequency of oscillations of the first oscillator at precisely the said interpolative frequency with constant phase.

12. A system for generating oscillations of an interpolative radio frequency locked to a standard frequency having, in combination, a standard source of electric oscillations, means for deriving from the source oscillations of radio frequency differing by a first predetermined intermediate radio frequency from the interpolative frequency, a first oscillator tunable to approximately the interpolative frequency, a first mixer connected to the deriving means and the oscillator for producing therein by beating oscillations of approximately the first predetermined intermediate frequency, means for selecting an harmonic of the first predetermined intermediate frequency, a second oscillator tunable to approximately the said harmonic of the first predetermined intermediate frequency, means for deriving from the source oscillations of radio frequency differing by a second predetermined intermediate radio frequency from the said harmonic of the first predetermined intermediate frequency, a second mixer connected to the last-named deriving means and the second oscillator for producing therein by beating oscillations of approximately the second predetermined intermediate frequency, means controlled from the source for generating oscillations of precisely the second predetermined intermediate frequency, a phase detector connected to the generating means and the second mixer for combining the oscillations of the same to obtain a voltage indicative of the difference in phase between them, means controlled in accordance with the said voltage for locking the frequency of oscillations of the second oscillator at precisely the said harmonic of the first predetermined intermediate frequency with constant phase, a further phase-detector connected to the harmonic-selecting means and the second oscillator for combining the oscillations of the same to obtain a further voltage indicative of the difference in phase between them, and means controlled in accordance with the said further voltage for locking the frequency of oscillations of the first oscillator at precisely the said interpolative frequency with constant phase.

13. A system for generating oscillations of an interpolative radio frequency locked to a standard frequency having, in combination, a standard source of electric oscillations, means for deriving from the source oscillations of radio frequency differing by a first predetermined intermediate radio frequency from the interpolative frequency, a first oscillator tunable to approximately the interpolative frequency, a first mixer connected to the deriving means and the oscillator for producing therein by beating oscillations of approximately the first predetermined intermediate frequency, means for selecting an harmonic of the first predetermined intermediate frequency, a second oscillator tunable to approximately the said harmonic of the first predetermined intermediate frequency, means for deriving from the source oscillations of radio frequency differing by a second predetermined intermediate radio frequency from the said harmonic of the first predetermined intermediate frequency, a second mixer connected to the last-named deriving means and the second oscillator for producing therein by beating oscillations of approximately the second predetermined intermediate frequency, means for selecting an harmonic of the second predetermined intermediate frequency, means controlled from the source for generating oscillations of precisely the frequency of the said harmonic of the second predetermined intermediate frequency, a phase detector connected to the generating means and the second mixer for combining the oscillations of the same to obtain a voltage indicative of the difference in phase between them, means controlled in accordance with the said voltage for locking the frequency of oscillations of the second oscillator at precisely the said harmonic of the first predetermined intermediate frequency with constant phase, a further phase-detector connected to the first-named harmonic-selecting means and the second oscillator for combining the oscillations of the same to obtain a further voltage indicative of the difference in phase between them, and means controlled in accordance with the said further voltage for locking the frequency of oscillations of the first oscillator at precisely the said interpolative frequency with constant phase.

14. A system for generating oscillations of an interpolative radio frequency locked to a standard frequency having, in combination, a standard source of electric oscillations, means for deriving from the source oscillations of radio frequency differing by a first predetermined intermediate radio frequency from the interpolative frequency, a first oscillator tunable over a predetermined range and to approximately the interpolative frequency, a first mixer connected to the deriving means and the oscillator for producing therein by beating oscillations of approximately the first predetermined intermediate frequency, means for selecting an harmonic of the first predetermined intermediate frequency outside the said predetermined tuning range of the first oscillator, a second oscillator tunable over a predetermined range and to approximately the said harmonic of the first predetermined intermediate frequency, means for deriving from the source oscillations of radio frequency differing by a second predetermined intermediate radio frequency from the said harmonic of the first predetermined intermediate frequency, a second mixer connected to the last-named deriving means and the second oscillator for producing therein by beating oscillations of approximately the second predetermined intermediate frequency, means for selecting an harmonic of the second predetermined intermediate frequency outside the said predetermined tuning range of the second oscillator, means controlled from the source for generating oscillations of precisely the frequency of the said harmonic of the second predetermined intermediate frequency, a phase detector connected to the generating means and the last-named harmonic-selecting means for combining the oscillations of the same to obtain a voltage indicative of the difference in phase between them, means controlled in accordance with the said voltage for locking the frequency of oscillations of the second oscillator at precisely the said harmonic of the first predetermined intermediate frequency with constant phase, a further phase-detector connected to the first-named harmonic-selecting means and the second oscillator for combining the oscillations of the same to obtain a further voltage indicative of the difference in phase between them, and means controlled in accordance with the said further voltage for locking the frequency of oscillations of the first oscillator at precisely the said interpolative frequency with constant phase.

References Cited in the file of this patent

UNITED STATES PATENTS

| | | |
|---|---|---|
| 1,571,224 | Allcutt | Feb. 2, 1926 |
| 2,036,958 | Reich | Apr. 7, 1936 |
| 2,248,442 | Stocker | July 8, 1941 |
| 2,288,025 | Pomeroy | June 30, 1942 |
| 2,332,540 | Travis | Oct. 26, 1943 |
| 2,400,648 | Korman | May 21, 1946 |
| 2,422,386 | Anderson | June 17, 1947 |
| 2,462,294 | Thompson | Feb. 22, 1949 |
| 2,521,070 | Lindner et al. | Sept. 5, 1950 |
| 2,558,100 | Rambo | June 26, 1951 |
| 2,564,059 | Gensel | Aug. 14, 1951 |
| 2,581,594 | MacSorley | Jan. 8, 1952 |
| 2,595,608 | Robinson | May 6, 1952 |
| 2,605,425 | Hugenholtz | July 29, 1952 |
| 2,617,039 | Young | Nov. 4, 1952 |
| 2,627,033 | Jensen et al. | Jan. 27, 1953 |
| 2,662,181 | Hugenholtz | Dec. 8, 1953 |
| 2,704,329 | Law | Mar. 15, 1955 |